2 Sheets—Sheet 1.
H. NEWHOUSE.
TIDE-POWER.
No. 189,643. Patented April 17, 1877.
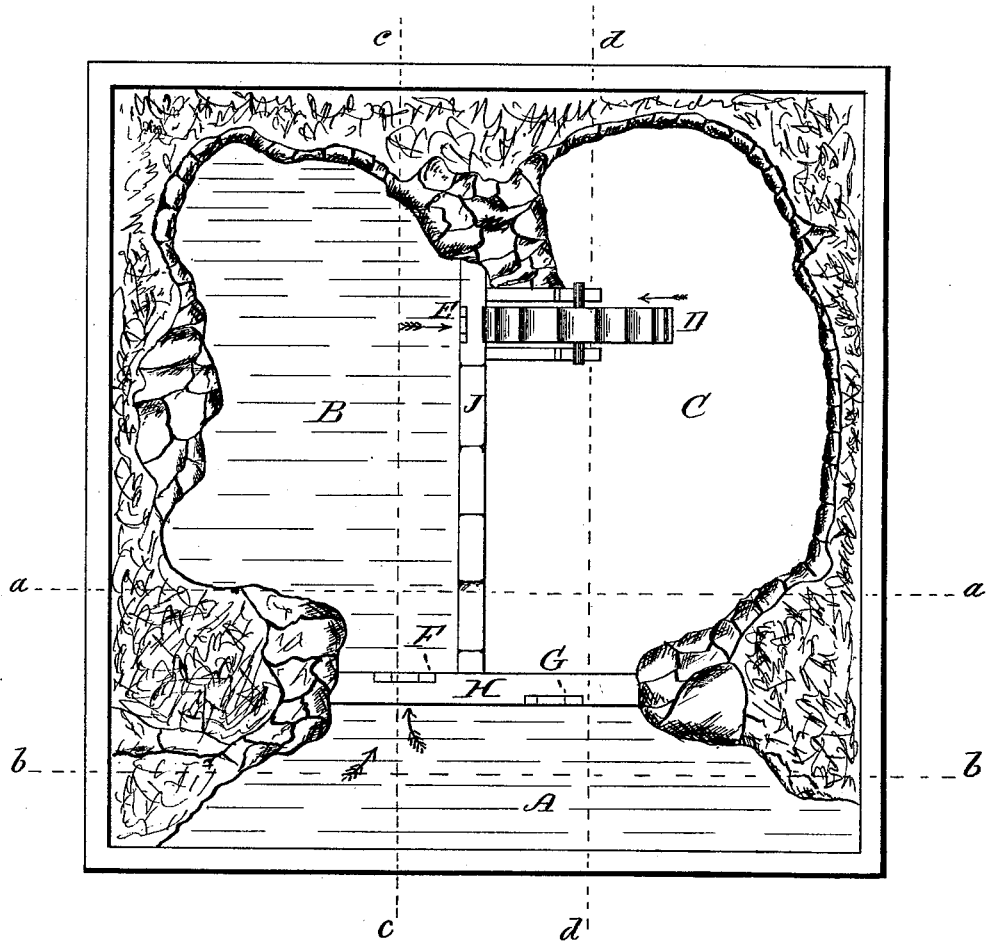
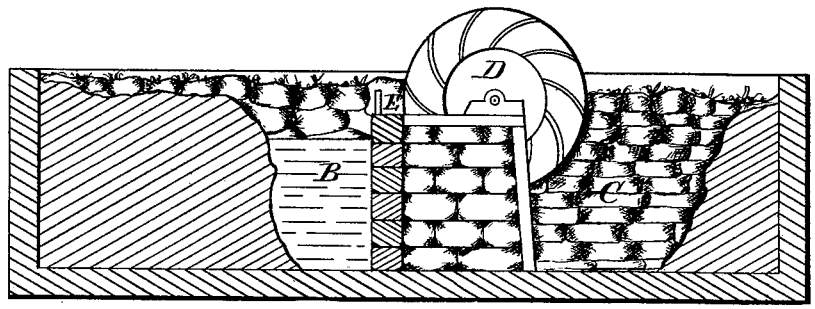
WITNESSES
John H. Redstone,
Otto Newhouse.
INVENTOR
Henry Newhouse, 2 Sheets—Sheet 2.

H. NEWHOUSE.
TIDE-POWER.

No. 189,643. Patented April 17, 1877.

WITNESSES
John H. Redstone,
Otto Newhouse,

INVENTOR
Henry Newhouse,

UNITED STATES PATENT OFFICE.

HENRY NEWHOUSE, OF OAKLAND, CALIFORNIA.

IMPROVEMENT IN TIDE-POWERS.

Specification forming part of Letters Patent No. 189,643, dated April 17, 1877; application filed January 4, 1877.

*To all whom it may concern:*

Be it known that I, HENRY NEWHOUSE, of Oakland, in the county of Alameda and State of California, have invented certain new and useful Improvements in Tide-Power, of which the following is a specification, reference being had to the accompanying drawing, and the letters marked thereon.

Figure 3:
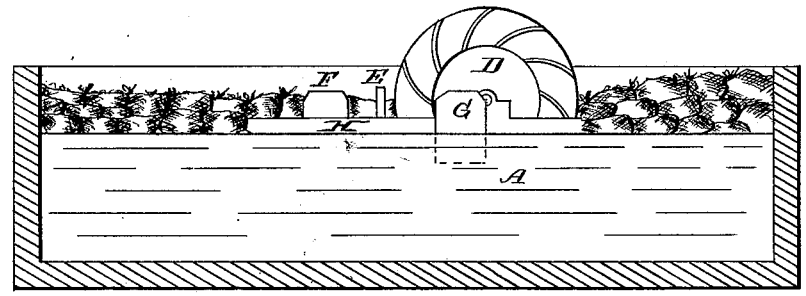
Figure 4:
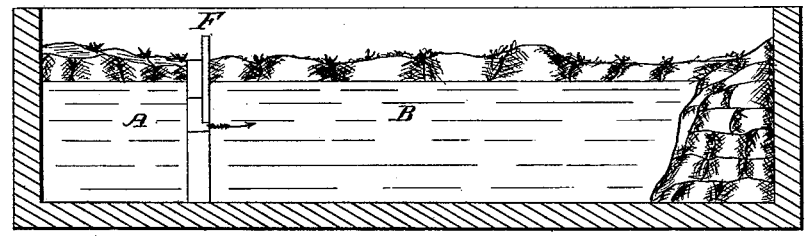
Figure 5:
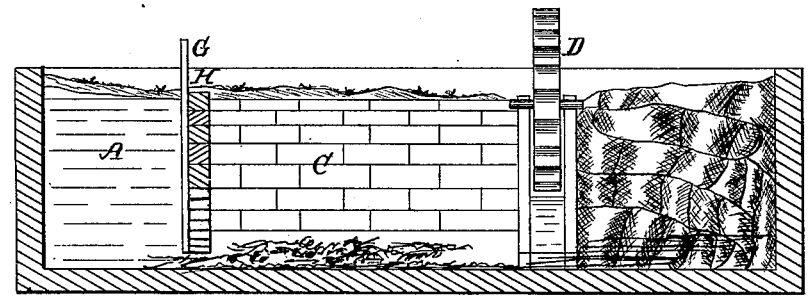

Figure 1 is a plan view. Fig. 2 is a section showing a cut through at the dotted lines $a\,a$. Fig. 3 is a section cut through $b\,b$. Fig. 4 is a section cut through $c\,c$, and Fig. 5 is a section through $d\,d$.

A represents the sea or main body of water; B, main supply or catch-basin; C, exhaust-basin; D, water-wheel; F, reservoir-gate; E, gate to water-wheel; G, waste-gate; H, the sea-wall; J, reservoir-wall or dividing wall.

The object of my invention is to utilize the tide for a water-power, and preserve a continuous power by means of the arrangement of a reservoir to catch the water at high-tide, and a discharge-basin to let the water out at low tide and shut it out while the tide is rising.

To effect this I have constructed the basin B as a catch-basin, and when the tide is full I open the gate and fill the same, and as soon as the same is full I close the gate E; and as soon as the tide recedes, the gate G being open, the water runs out down to low tide; the waste-gate G is then closed, and kept closed except at low tide.

The following is the operation of the same: As the tide reaches its highest point, the gate F having been fully opened, the basin B is filled and the gate F is closed. When the tide has receded to its lowest point, the gate G being open, the water flows out and the basin C is drawn out or emptied to the level of the lowest tide; the water is then turned onto the wheel D, through the gate E, giving a pressure equal to the difference between high and low tide. As soon as the low tide has been reached the gate G is closed, and the water is allowed to flow into the basin C from the basin B, while the tide is still rising on the outside, furnishing power to the wheel D, and when high tide is again reached the basin B is again filled by raising the gate F, and the basin C again drawn off at low tide through the gate G, and thus the process is repeated; and where a large basin can be secured for a waste-basin C, and also a large basin for the reservoir B, the variation will be but trifling, and not nearly so much as the effect of dry seasons on the ordinary water-power from running streams or catch-basins supplied from water-sheds.

The advantages of a great fall of water which may sometimes be had from streams are more than equaled by the unlimited supply which may be had by my invention, and the immense weight of water that may be poured upon a breast or other suitable wheel.

I am aware that it is not new to construct a tide-power having a high and low water basin with automatic valves, as described in the patent granted to A. Mallory, March 14, 1876, No. 174,692; and I am also aware that it is not new to half-tide reservoirs in connection with reservoir, as set forth in the description contained in Mechanic's Magazine of 1846, vol. 45, page 142—both of which I disclaim, and do not wish to be understood as covering in my invention such construction of tide-power; but Having described my invention, what I do claim as new, and desire to secure by Letters Patent, is—

The waste-basin C, with under-shot water-wheel D, and the reservoir B, the same being separated from the basin by the wall J, and inclosed by the sea-wall H, and the arrangement of the gates E F G in relation thereto and operating as set forth.

HENRY NEWHOUSE.

Witnesses:
JOHN H. REDSTONE,
OTTO NEWHOUSE.